United States Patent [19]

Lai

[11] Patent Number: 5,734,911
[45] Date of Patent: Mar. 31, 1998

[54] METHOD OF LINKING PERIPHERAL DEVICES ALL OF WHICH USE THE SAME IRQ TO A SINGLE INTERRUPT PROCEDURE

[75] Inventor: Arthur Lai, Scarborough, Canada

[73] Assignee: ATI Technologies Inc., Thornhill, Canada

[21] Appl. No.: 569,601

[22] Filed: Dec. 8, 1995

[30] Foreign Application Priority Data

Oct. 5, 1995 [CA] Canada .................................. 2159979

[51] Int. Cl.$^6$ .................................................. G06F 9/46
[52] U.S. Cl. .......................... 395/742; 395/733; 395/867; 395/868; 395/739; 395/870
[58] Field of Search ...................... 395/742, 725, 395/741, 867, 868, 739, 870, 733; 364/900, 200

[56] References Cited

U.S. PATENT DOCUMENTS

| | | |
|---|---|---|
| 4,342,078 | 7/1982 | Tredennick et al. |
| 4,488,227 | 12/1984 | Miu et al. |
| 4,646,260 | 2/1987 | Chasse et al. |
| 5,369,769 | 11/1994 | Martin et al. |

*Primary Examiner*—Jack B. Harvey
*Assistant Examiner*—Rupal D. Dharia
*Attorney, Agent, or Firm*—E. E. Pascal; R. A. Wilkes

[57] ABSTRACT

A method of linking peripheral devices to a single interrupt procedure in a computer is comprised of storing in an interrupt vector table of a BIOS ROM, a first pointer to an interrupt service routine related to one of a group of peripheral devices which use the same interrupt request (IRQ) on the same software interrupt vector, and storing further pointer in each one of the peripheral devices to another unique one of the peripheral devices in the group.

6 Claims, 4 Drawing Sheets

METHOD OF LINKING PERIPHERAL DEVICES ALL OF WHICH USE THE SAME IRQ TO A SINGLE INTERRUPT PROCEDURE

FIELD OF THE INVENTION

This invention relates to the field of computers, and particularly to a method of linking an add-on peripheral device which contains a read only memory (ROM) to an interrupt processing procedure.

BACKGROUND TO THE INVENTION

When adding circuits to a computer such as a personal computer, they must be initialized. One of the procedures of initialization is to log the circuit being added into the computer so that it can be serviced by the computer microprocessor or services can be requested by applications software. The microprocessor must be able to recognize interrupt requests for service (IRQs), and to identify the circuit requesting the service. The service can be initiated by hardware or software.

FIG. 1 illustrates several basic components of a personal computer. A microprocessor 1 is connected to a random access memory 3, permanent memory such as a hard disk drive 5, and other peripheral devices represented by peripheral 7, via an expansion bus 9. Peripheral devices can include any devices which require attention by microprocessor 1, such a keyboard, a pointing device such as a mouse, a data input-output device such as a modem, a peripheral subsystem such as a graphics display subsystem, etc.

In order to be serviced by the microprocessor 1, a peripheral device calls for attention by generating an interrupt request (IRQ), which is communicated to the microprocessor 1 via the expansion bus or another conductor. The microprocessor 1 determines the address of the peripheral device, and the priority by which it is to be serviced, by looking up the IRQ in an interrupt vector table 11 stored in a BIOS read only memory (ROM) 13, which is connected to the bus 9. Thus the interrupt vector table is comprised of at least a listing of IRQ numbers and associated pointers to an address associated with the peripheral device.

Typically the address pointed to is of a service routine (program) which is stored in RAM 3 and which is dedicated to the associated peripheral device, and is therefore in effect a pointer to the peripheral device itself. In simple terms, once the IRQ and associated service routine pointer are read, the processor finishes whatever routine or microroutine it is performing, stores the parameters, addresses, values, etc. in its registers at the conclusion of the routine or microroutine in a swap register, and addresses the peripheral or software routine which has called for servicing. This could be, for example, to implement reading of the value of a keystroke of a keyboard.

Thus each peripheral has its own IRQ number. This is shown in FIG. 2A, which shows the interrupt vector table 11 containing plural IRQ vectors, which are individual pointers to service routines of various corresponding peripheral devices. In FIG. 2A, the peripheral devices are plug-in add-on circuits each of which contains an expansion ROM 15B, 15C and 15D, and a standard ROM 15A. Thus there is a one to one correspondence between IRQs and peripheral devices, in this form of prior art interrupt system.

In single form, during initialization of any newly added peripheral device, the BIOS 13 scans the bus 9 and determines whether there is an expansion ROM installed in the system. It is the system BIOS' responsibility to install the hardware and software interrupt vector provided that these are standard functions and standard hardware to the system. An example is the keyboard interrupt and system timer etc. For non-system devices, such as VGA card, it is the expansion ROM's init code responsibility to update the interrupt vector in the system. For a hardware device, the BIOS 3 scans the bus 9 and determines its IRQ number from an IRQ identity already stored in the peripheral device, for example programmed into it by a group of DIP switches. Alternatively, the IRQ number can be programmed into the peripheral device by the main system detecting its presence, determining unused IRQ vectors in the BIOS ROM, and assigning one of the unused IRQ vectors to the new peripheral device.

The vector is stored in the vector table 11 and is also stored in the ROM of the newly added peripheral device. For each add-on card (circuit), a dedicated vector is assigned.

FIG. 2B illustrates a method of redirecting interrupt vectors. The vector table 11 stores plural interrupt pointers, e.g. vector A, vector B, vector C and vector D. Vector A points to a peripheral device expansion ROM 15D, which stores in its ROM the identity of another vector, vector B. Vector B points to another expansion ROM 15C, which stores in its ROM the identity of another vector, vector C. Vector C points to expansion ROM 15B, which stores in its ROM the identity of another vector, vector D. Vector D points to the standard ROM 15A.

In this manner an add-on card uses the standard interrupt vector, but shifts the original interrupt to another interrupt vector location. This is done, for example to link VGA and CGA graphic adapter circuits. In this example the VGA circuit might use interrupt INT 10 and place the original CGA circuit vector into INT 42. The VGA interrupt processing routine (int 10h) passes all calls into INT 42 if the call does not belong to itself.

FIG. 2C illustrates a method of using a single interrupt vector table entry for plural peripheral devices. In this case a pointer vector A points to a memory resident program TSR 16, which is in effect an expansion of the vector A. The TSR 16 redirects all software interrupts to the proper device 15A, 15B, 15C or 15D. The TSR thus replaces the original software interrupt vector to point to the proper interrupt processing routine. The TSR determines and dispatches all of the interrupt calls.

It is not uncommon for computers to have insufficient IRQ pointers and software interrupt vectors, and IRQ conflicts often result. This is a particular problem where IRQs are preassigned, as in the prior art systems described above.

In the event the IRQs are not all preassigned, the requirement to have a one-to-one relationship between IRQs and peripheral devices, and software interrupt vectors whether in a vector table or in a TSR, requires system resources such as random access memory (RAM) based programs to be used, which reduces the amount of system memory available to process application programs.

It will be recognized that two kinds of service requests are typically used, one being hardware initiated and the other being software initiated.

In a hardware initiated service, a hardware device in the system can generate an interrupt request if an external event has happened or if a service is required. An example is a keystroke that has been entered through the keyboard and is ready to be processed. In this case, a hardware interrupt will be generated and the servicing routine will put the character into a keyboard buffer. The hardware initiated services does not require a function code. The interrupt servicing routine can read the hardware status and determine if it is the one that has initiated the interrupt before the processing or can pass the call to the next one in the chain.

In a software initiated service software requests an interrupt servicing routine to perform a specific function to a piece of hardware in the system. An example is a software request for an input from the keyboard. The software will initiate a software interrupt to read a keystroke from the keyboard. If the keystroke is buffered, the interrupt routine will return the buffered data without waiting.

An example software interrupt routine to read a keystroke is:

```
mov   ah,00h
int   16h
```

Another example is to write a character 'X' to an active display adapter.

```
mov   ah,0eh        ;function code to write a
                    character to display
mov   al,'X'        ;character 'X'
int   10h           ;invoked the video interrupt
                    servicing routine
```

In the example above, the value 0eh in the register is a valid or supported function code for the interrupt service routine 10h. The valid or supported function code is well defined and is specific to a particular interrupt servicing routine. For INT 10h, AH=00h to 1Ch are valid function codes and 1Dh to 0FFh are invalid or non-supported function codes.

SUMMARY OF THE INVENTION

The present invention provides a more effective method of linking add-on circuits to IRQ vectors and software interrupt vectors which does not need a RAM based program. Indeed, a single software interrupt vector can be shared without conflict and without using a TSR. Thus system resources are conserved for use by application programs.

The present invention is dynamic and need not be preconfigured. There is no conflict with other software interrupts used by the system. It is backward compatible with existing systems and software, and the linking is transparent to software which does or does not use software interrupts.

The present invention also takes advantage of the fact that for some types of expansion peripheral devices, such as a PCI device, their expansion ROMs are writeable at initialization time.

In accordance with an embodiment of the invention, method of linking peripheral devices to a single interrupt procedure in a computer is comprised of storing in an interrupt vector table of a BIOS ROM, a first pointer to an interrupt service routine related to one of a group of peripheral devices which use the same interrupt request (IRQ), or the same software interrupt vector and storing a further pointer in each one of the peripheral devices to another unique one of the peripheral devices in the group.

BRIEF INTRODUCTION TO THE DRAWINGS

A better understanding of the invention will be obtained by reading the description of the invention below, with reference to the following drawings, in which.

DETAILED DESCRIPTION OF THE INVENTION

Figure 1:
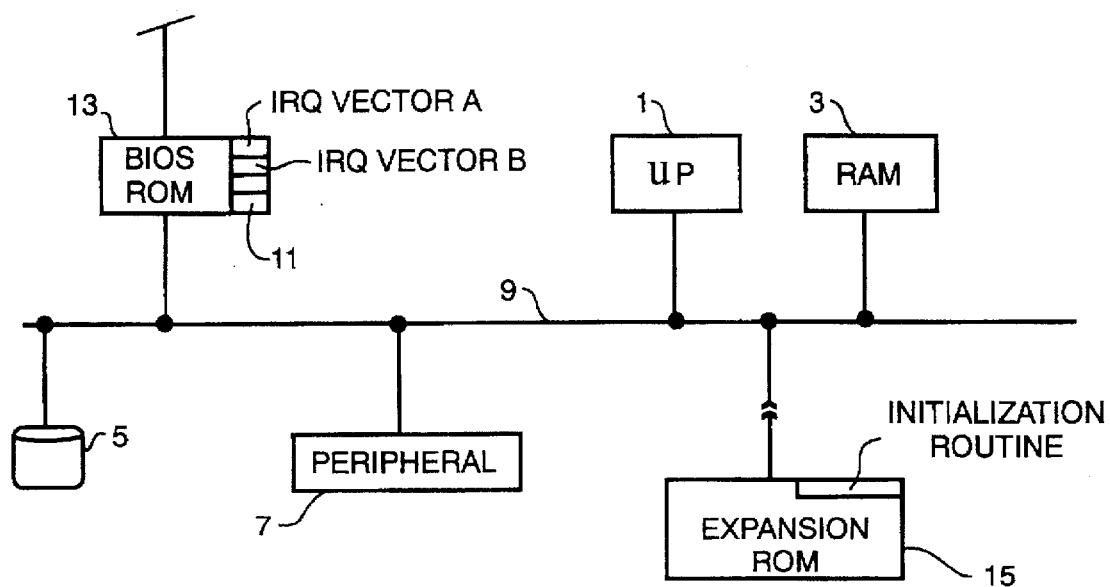
FIG. 1 is a block schematic of a portion of a personal computer system.
Figure 2A:
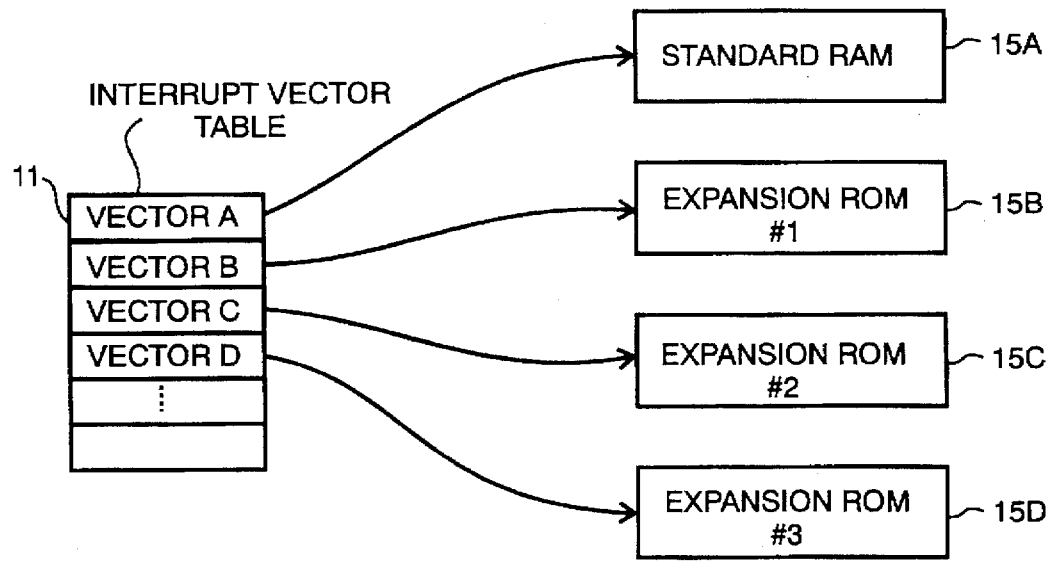
FIGS. 2A, 2B and 2C are illustrations of prior art interrupt methods.
Figure 2B:
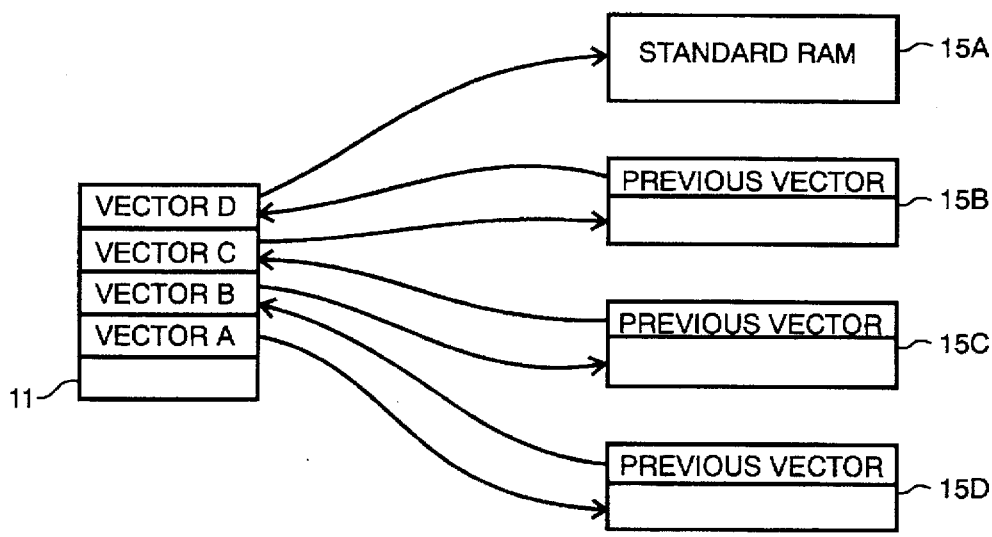
Figure 2C:
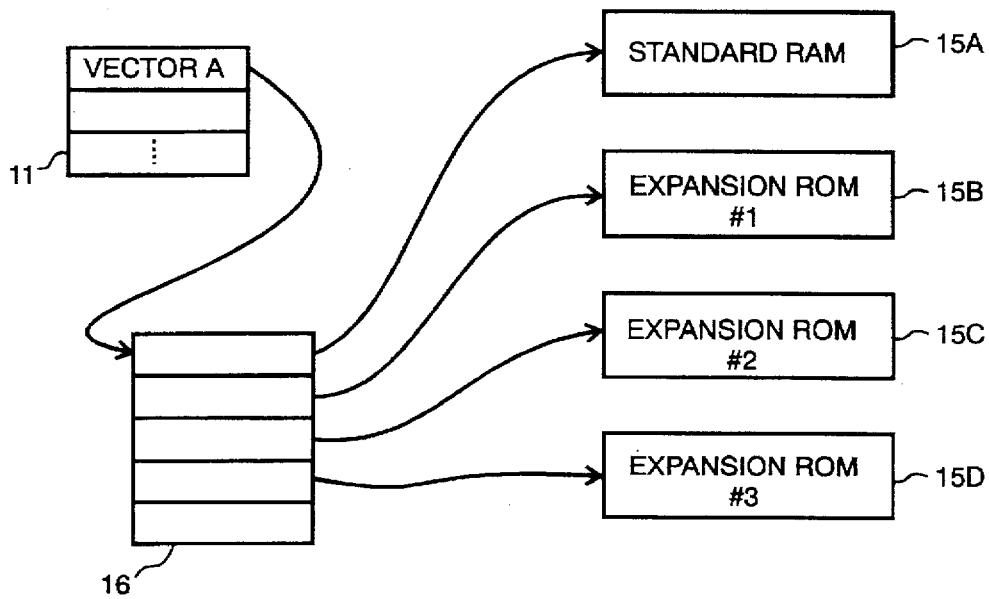
Figure 3:
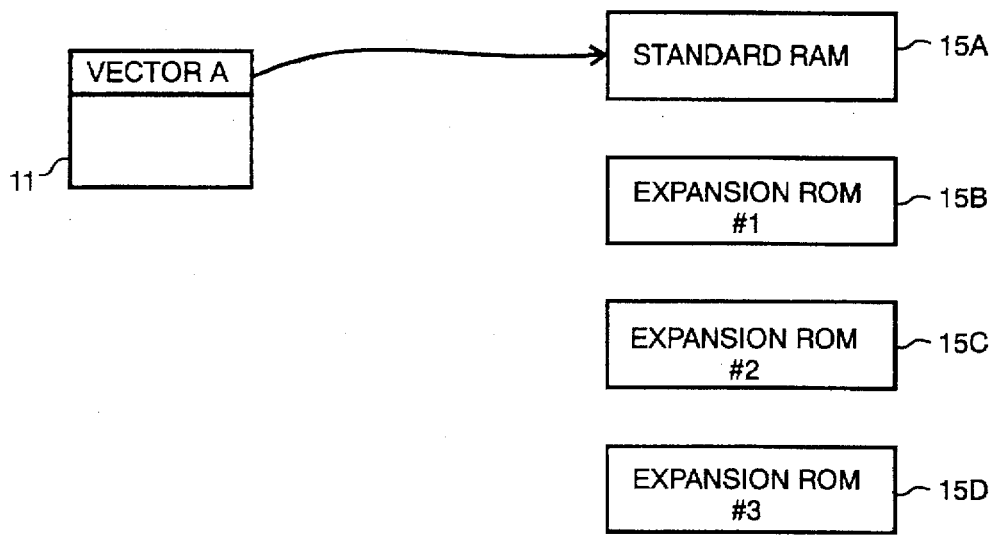
FIG. 3 is an illustration of a prior art interrupt method, prior to initialization of add-on expansion circuits.

FIG. 3 illustrates a first peripheral device, a standard ROM 15A. The vector table 11 contains vector A, i.e. a first IRQ, which in the prior art points to an interrupt service routine of the standard ROM 15A as shown. Now peripheral devices which include expansion ROMS 15B, 15C and 15D are to be added.

In accordance with the present invention, plural devices can share the same IRQ number (interrupt vector) or software interrupt vector, without the requirement to use a RAM based program, and without the requirement to use additional system memory. Each peripheral device which shares the same software interrupt vector has an additional function code which is unique as an identifier. That additional function code is stored in the ROM BIOS with the IRQ number at the sharing peripheral device. Other mutually different function codes are stored with the same IRQ number at the other sharing peripheral devices.

When a new expansion ROM is discovered, the expansion ROM BIOS assigns an unused function code to it, and stores it in association with the previous interrupt vector in its BIOS ROM. The new peripheral device stores the previously unused function code and the IRQ number, and as well receives the function code identity of the previous peripheral device that had been pointed to in the interrupt vector table.

The above is continued in daisy chain, wherein each of the peripheral devices which share an IRQ with each other contain a function code address of a previous one. These function code addresses are in effect pointers to other peripheral devices.

The non-supported function codes referred to earlier are used as an identification code for different expansion ROM in the system for interface purposes.

Figure 4:
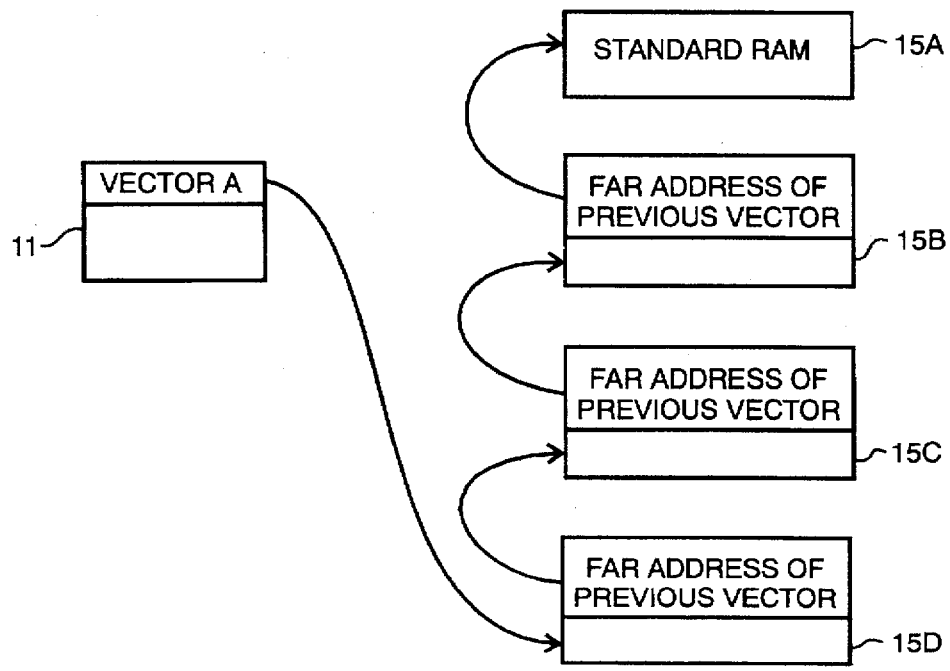
FIG. 4 is an illustration used to explain the present invention.

More particularly, in accordance with an embodiment of the invention as shown in FIG. 4, the vector A now contains a pointer to the expansion ROM 15D of the third add-on circuit, which contains the pointer of a previous vector, i.e. the address of a second add-on circuit which includes expansion ROM 15C. ROM 15C contains the pointer of a previous vector, i.e. the address of a second add-on circuit which includes expansion ROM 15B. Expansion ROM 15B contains the pointer of a previous vector, i.e. the address of the original standard ROM 15A.

Thus in operation, when an interrupt request is received by the microprocessor 1 from any of the peripheral circuits 15A–15D, it will contain an IRQ number and a function number. The microprocessor 1 looks up the IRQ number in the vector table 11, and determines that it points to expansion ROM 15D, However, since the IRQ request also includes the function which is unique to the peripheral device which requested the interrupt, upon accessing the peripheral device 15D, by the daisy chain address pointers between the expansion ROMs and the standard ROM, the identity of the specific peripheral device which has requested the interrupt is identified to the microprocessor.

The microprocessor 1 then saves and uses the IRQ and function for further processing to service the peripheral device requesting the interrupt.

It should be noted that while peripheral devices that include expansion ROMs are described herein, there is no restriction on the type of peripheral device that is interrupt serviced in the manner described herein, as long as it contains a ROM which can store the function of another peripheral device. The invention is particularly useful, however, to log in PCI peripheral devices, which are frequently added and removed from a system.

Figure 5:
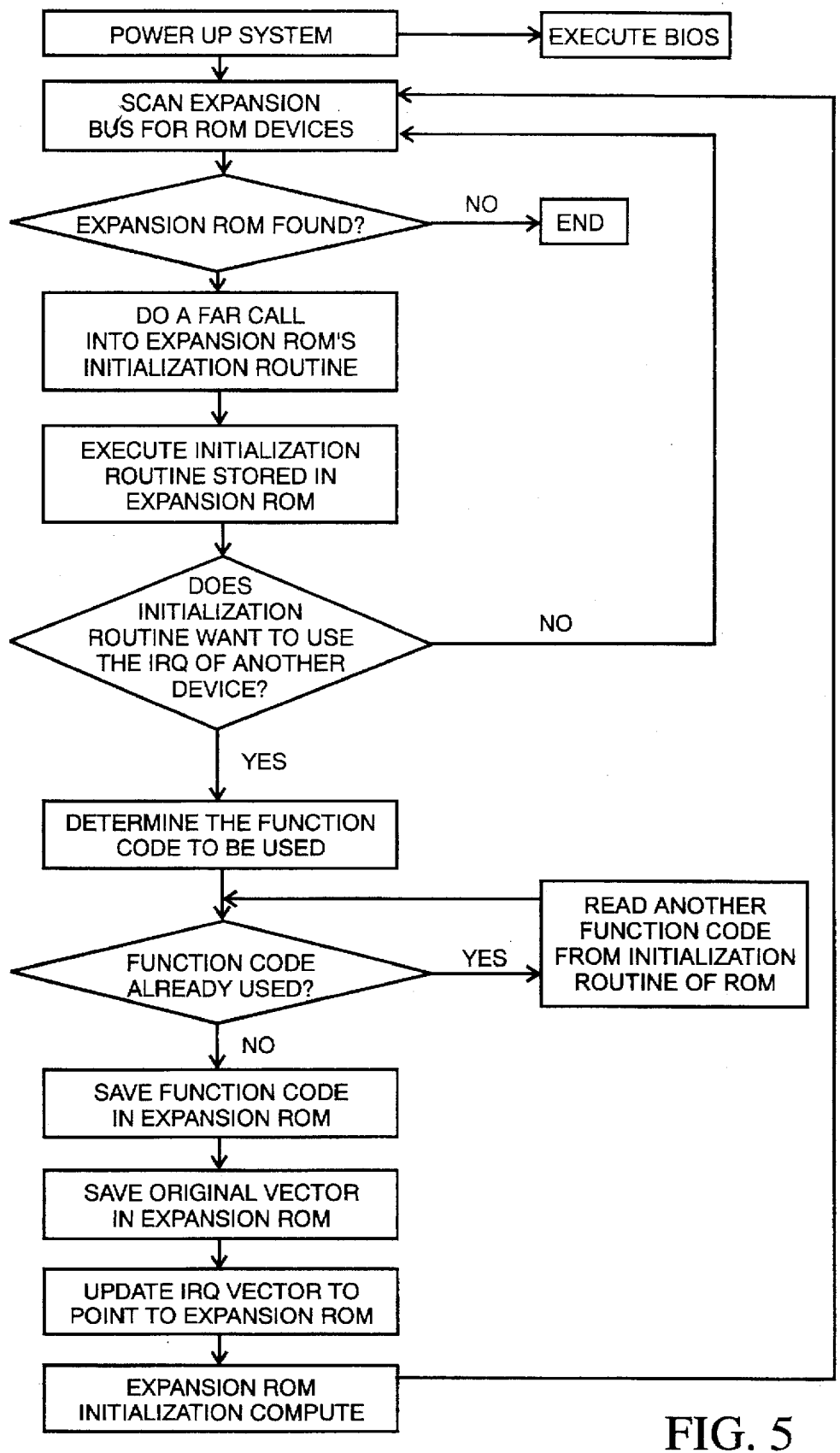
FIG. 5 is a flow chart of the present invention.

FIG. 5 is a flow chart illustrating how the peripheral devices are initialized for the hardware interrupt case.

A system is powered up. Using a microprogram stored as part of the BIOS in a well known manner, the expansion bus is scanned for peripheral devices such as expansion ROMs, and the IRQs are noted. The nonconflicting and identified IRQs of the located peripheral devices are stored in the interrupt vector table of the BIOS.

In accordance with an embodiment of the invention, in the event conflicting IRQs are located, a far call is performed into the initialization routine stored in the expansion ROMs, each in order. The initialization routine is executed. The initialization routine identifies the IRQ that it wishes to use. In the event the IRQ is the same IRQ of another peripheral device, a function code is read from the initialization routine, and is provided to the microprocessor. The microprocessor checks each peripheral device to determine whether that function code is already used for any peripheral device.

In the event the function code is already used, another function code is chosen by the initialization routine of the expansion ROM, and is checked in a similar manner as the earlier.

In the event the function code is not already used the function code is stored in the expansion ROM. That function code is stored in the BIOS ROM in association with the IRQ for use as described above. Also as noted above, only the most recent function code which uses an already used IRQ is stored in the BIOS ROM with the function code of the peripheral device previously associated with the IRQ, stored in the expansion ROM of the most recent expansion ROM.

The value of a non-conflicting function code is identified as follows. When the initialization routine of the expansion ROM is executed, the microprocessor returns a function code from a list of non-used function codes stored in the BIOS, but which are assumed not to relate to any peripheral devices of the system. The microprocessor calls the peripheral device using that function code. In the event the function returns to the microprocessor without error, it is assumed that there is an add-on circuit that has already used that function as an identifier, since only that add-on circuit can identify the function code. The microprocessor, using the BIOS, then tries another one, until an error is returned.

However, in the event and error function code is returned, it is clear that no other peripheral device has claimed it as an identifier. The microprocessor, using the BIOS then assigns the function code to the expansion ROM, and saves it in its ROM address space in association with the IRQ number. The microprocessor then updates the expansion ROM with the function code and IRQ number as described earlier.

Normal initialization is then continued and completed, and the expansion ROM checksum is updated for hardware interrupts.

In accordance with the present invention, for hardware interrupt plural peripheral devices can share the same IRQ. Each peripheral device has its own unique identification code, which distinguishes one from the other.

When a hardware device generates an interrupt, the hardware processing routine can check if the interrupt is generated by its hardware. If not, it can pass the call to the next one in the chain.

For the software initiated case, as in the prior art example given earlier, AH=1Dh to 0FFh are non-supported function codes for the software interrupt function INT 10h. In an embodiment of the present invention, 0A0h and 0AFh can be chosen as the non-supported function codes when the expansion ROM is a daisy chained to INT 10h. When a non-supported function code is used to invoke an interrupt service routine, no CPU registers or task will be performed by the routine. Thus if software executes the following code:

```
mov    ah,0A1h
mov    al,012h
int    10h
``` the standard INT 10h processing routine will determine this is an invalid call and will pass this call to the next processing routine, which is INT 42h, in the chain. INT 42h will also look at the function code (AH=0A1h) and it will not process it. The INT 42h will then return to the caller without processing because it is the last one on the chain. Then INT 10h will return to the caller which is the application software.

Thus in the end, if an invalid function code is used in a software interrupt, nothing happens. We can use this information or characteristic to determine if a non-supported function code has already been used by hardware or software in the interrupt chain. For example, if the function 0A1h has been processed, the CPU registers return can be different (on purpose) and the next one which is 0A2h can be tried. If 0A2h is not used, the caller will save this code and the original interrupt vector into its expansion ROM, and replace the original interrupt to point to its own processing routine.

Thus if there is an application that executes the following code

```
mov    ah,0A2h
mov    al, 012h
int    10h
``` the last expansion ROM that put itself in the daisy chain will get the first chance of processing it. In our example, the last expansion ROM will then process this call and return to the caller afterwards. It can modify the CPU registers to indicate that this function has been processed. Thus this non-supported function code is actually used as a means to identify and communicate with a specific expansion ROM in the system.

For the software initiated case, the software can invoke different expansion ROMs to perform different tasks. The following is an example

```
mov    ah,0A1h    ;invoke to the first
                  expansion ROM in the chain
mov    al,00eh    ;function code, to set
                  Power Management State
mov    cl,000h    ;to turn on the monitor
mov    10h
```

```
mov    ah,0A2h    ;invoke to the second
                  expansion ROM in the chain
mov    al,00eh    ;function code, to Set
                  Power Management State
mov    cl,003h    ;to run off the monitor
int    10h
```

Consider now an example of initiation and operation of a software interrupt, for an IBM compatible desktop computer having a PCI bus, a hard disk drive, a keyboard, a mouse, a VGA card, and a Mach 64A, a Mach 64B and two Mach 64 PCI graphics boards (sold by ATI Technoloiges Inc. of Toronto, Canada) with VGA disabled. Each Mach 64 board has an 8 kilobyte expansion ROM, and are placed at addresses C800:0h and CC00:0h by the system B105.

The system is initialized, the VGA initialized and the display appears. INT 10h is pointed to the VGA expansion ROM which is in C000:1000h (it can be anywhere between C000:0 to C000:8000h).

System BIO finds the expansion ROM in C800:0. It does a checksum of the ROM and finds everything OK. It does a far call to C800:3 to execute the initialization code in the expansion ROM.

As a result, the expansion ROM of the MACH64A gets control, the expansion ROM initializes mach64A hardware, and the expansion ROM chains itself into the INT 10h by carrying out the following steps.

The expansion ROM issues a function to INT 10h with AH=0A1h. In this case, based on the returned information, it indicates AH-0A1h is not processed or used by anyone. The init code in the expansion ROM then saves the value 0A1h into its ROM and uses this value as a way to identify or communicate itself. It then saves the interrupt vector INT 10h into the ROM and the old INT 10h becomes the next expansion ROM in the daisy chain. It then updates the INT 10h vector to point to its interrupt processing routine.

The initialization is complete and the processor returns to the caller.

At this point, the INT 10h vector is pointing to the Mach64A expansion ROM. The mach64A ROM has the original INT 10h vector stored and will use it as a pointer to the next one on the daisy chain. The function code 0A1h is also stored and it will use it for communication purpose. The mach64A expansion ROM will process all the calls that have AH=0A1h and will pass on all the other calls. For example, the

```
mov    ah,0Eh
mov    al,'X'
int    10h
```

The mach64A ROM will see that AH!=0A1h and will pass the function call to the next one in the chain.

```
mov    ah,0A1h
mov    bl,012h
mov    cl,000h
int    10h
```

In this case, the mach64A ROM will process the call and return to the caller when complete.

The system BIOS continues the scan and finds an expansion ROM in CC00:0. It does a checksum on the ROM and everything is OK. It does a far call to CC00:3 to execute the initialization code in the expansion ROM. As a result the expansion ROM of MACH64B gets control, the expansion ROM initializes mach64B hardware, and the expansion ROM chains itself into the INT 10h by carrying out the following steps.

The expansion ROM issues a function to INT10with AH=0A1h. In this case, based on the returned information, it will be indicated that AH=0A1h is already used (i.e. by MACH64A). Then it tries AH=0A2h and detects that it is not being processed. The init code in the expansion ROM then saves the value 0A2h in the ROM and uses this value as a way to identify or communicate itself, then saves the interrupt vector INT 10h into the ROM and the old INT 10h becomes the next expansion ROM in the daisy chain. It then updates the INT 10h vector to point to its interrupt processing routine. The initialization is now complete and the processor returns to the caller.

At this point, the INT 10h vector is pointing to the Mach64B expansion ROM. The mach64B ROM has a pointer pointing to the mach64A ROM. The mach64A ROM has a pointer pointing to the original INT 10h. The function code 0A2h is stored in mach64B and the function code A1h is stored in mach64A expansion ROM for communication purposes. The mach64B expansion ROM will process all the calls with AH=0A2h and pass on all other calls to the next one in the chain. The mach64A expansion ROM will process all the calls with AH-0A1h and will pass all the other calls to the next one in the chain.

For example, for the code

```
mov    ah,0Eh
mov    al,'X'
int    10h
``` the mach64B ROM will see that AH!=0A2h and will pass the function call to mach64A. The mach64A ROM will see that AH!=0A1h and will pass the function call to the original INT 10h routine.

```
mov    ah,0A1h
mov    bl,012h
mov    cl,000h
int    10h
``` the mach64B ROM will see that AH!=0A2h and will pass the function call to mach64A. The mach64A ROM will process the call and return to the caller when complete.

The system will then scan for other expansion ROMs. If no additional expansion ROM found, it will start the boot process.

Based on the above-described method, there is no limit to the size of the daisy chain. The generation of the daisy chain is done at runtime without using any additional system resource.

A person understanding this invention may now conceive of alternative structures and embodiments or variations of the above. All of those which fall within the scope of the claims appended hereto are considered to be part of the present invention.

I claim:

1. A method of linking peripheral devices to a single interrupt procedure in a computer comprising storing in an interrupt vector table of a BIOS ROM, a first pointer to an interrupt service routine related to one of a group of peripheral devices all of which use the same interrupt request (IRQ) or the same software interrupt vector, and storing a further pointer in each one of the peripheral devices to another unique one of the peripheral devices in the group.

2. A method as defined in claim 1 in which each further pointer points to a last expansion ROM executed using the same interrupt vector.

3. A method as defined in claim 2 including storing in association with the first pointer, the identification code of only a last initialized one of the peripheral devices.

4. A method as defined in claim 2 including the microprocessor servicing the interrupt request by addressing said last initialized one of the peripheral devices, and receiving data from the peripheral device which had generated the interrupt request.

5. A method as defined in claim 2 including initializing a peripheral device by the microprocessor (i) addressing the peripheral device using an identification code from a list of non-supported function codes, (ii) selecting a different function code in the event an error signal is not returned and repeating steps (i) and (ii), and (iii) assigning the function code to the peripheral device in the event that an error signal is returned.

6. A method as defined in claim 1 including one of the peripheral devices providing to a microprocessor an interrupt request which includes both an IRQ and the function code of said one of the peripheral devices.

* * * * *